(12) United States Patent  (10) Patent No.: US 8,588,115 B2
Gao et al.  (45) Date of Patent: Nov. 19, 2013

(54) APPARATUS FOR CONTROLLING CHANNEL SWITCHING IN WIRELESS NETWORKS

(75) Inventors: Wen Gao, West Windsor, NJ (US); Hang Liu, Yardley, PA (US)

(73) Assignee: Thomson Licensing, Boulogne-Billancourt (FR)

( * ) Notice: Subject to any disclaimer, the term of this patent is extended or adjusted under 35 U.S.C. 154(b) by 989 days.

(21) Appl. No.: 12/087,557

(22) PCT Filed: Dec. 19, 2006

(86) PCT No.: PCT/US2006/048408
§ 371 (c)(1),
(2), (4) Date: Jul. 9, 2008

(87) PCT Pub. No.: WO2007/081503
PCT Pub. Date: Jul. 19, 2007

(65) Prior Publication Data
US 2009/0067354 A1    Mar. 12, 2009

Related U.S. Application Data

(60) Provisional application No. 60/757,998, filed on Jan. 11, 2006.

(51) Int. Cl.
*H04B 7/00* (2006.01)
*G08C 17/00* (2006.01)
*H04W 4/00* (2009.01)
*H04J 3/06* (2006.01)

(52) U.S. Cl.
USPC ............ 370/310; 370/311; 370/329; 370/350

(58) Field of Classification Search
USPC .................................. 370/310, 311, 329, 350
See application file for complete search history.

(56) References Cited

U.S. PATENT DOCUMENTS

| 5,164,942 A | 11/1992 | Kamerman et al. |
|---|---|---|
| 5,682,147 A | 10/1997 | Eaton et al. |
| 6,826,402 B1 | 11/2004 | Tran |
| 7,379,447 B2 * | 5/2008 | Dunagan et al. .............. 370/350 |
| 2002/0067892 A1 | 6/2002 | Oguro |
| 2002/0085622 A1 | 7/2002 | Dhar et al. |

(Continued)

FOREIGN PATENT DOCUMENTS

| CN | 1156528 A | 8/1997 |
|---|---|---|
| JP | 200594337 | 4/2005 |

(Continued)

OTHER PUBLICATIONS

International Search Report, dated May 16, 2007.

(Continued)

*Primary Examiner* — William D Cumming
(74) *Attorney, Agent, or Firm* — Robert D. Shedd; Jerome G. Schaefer (57) ABSTRACT

The invention provides apparatus methods for avoiding channel collisions in Wireless Regional Area Networks (WRAN), A medium access controller (MAC) for switching a base station (BS) of a WRAN from a first channel to a second channel at a time t is provided. The MAC includes a switch time delay circuit for delaying said switching with respect to time t by a random delay time.

6 Claims, 7 Drawing Sheets

(56) References Cited

U.S. PATENT DOCUMENTS

| | | |
|---|---|---|
| 2004/0203808 A1 | 10/2004 | Mathur |
| 2006/0274776 A1 | 12/2006 | Malik et al. |
| 2009/0067354 A1* | 3/2009 | Gao et al. ............... 370/310 |
| 2010/0067416 A1* | 3/2010 | Gao et al. ............... 370/311 |
| 2010/0177712 A1* | 7/2010 | Kneckt et al. ........... 370/329 |

FOREIGN PATENT DOCUMENTS

| | | |
|---|---|---|
| JP | 200553717 | 12/2005 |
| RU | 2171013 | 3/1993 |
| WO | 93/18601 | 9/1993 |
| WO | 95/34149 | 12/1995 |

OTHER PUBLICATIONS

IEEE Nov. 2005 Working Group Agenda. Printed from "802.22 WRAN Graphic" page of www.IEEE802.22.org/22/ Contributions and Meetings Documents, Page group 36, Year 2005, DCN 89, Rev 4, entitled "802 22 Tentative Agenda Nov05", upload date Nov. 14 2005.

Thomson Proposal Outline for WRAN Rev 0. Document IEEE 802.22-05/0096rev0. Printed from www.IEEE802.22.org/22/ Contributions and Meetings Documents, Page group 36, Year 2005, DCN 96, Rev 0, entitled "Thomson Proposal Presentation", upload date Nov. 8, 2005.

IEEE Jan. 2006 Working Group Agenda. Printed from "802.22 WRAN Graphic" page of www.IEEE802.22.org/22/ Contributions and Meetings Documents, Page group 36, Year 2005, DCN 116, Rev 3, entitled "802 22 Tentative Agenda Jan06", upload date Jan. 16, 2006.

Thomson Proposal Outline for WRAN Rev 1. Document IEEE 802.22-05/0096rev1. Printed from www.IEEE802.22.org/22/ Contributions and Meetings Documents, Page group 36, Year 2005, DCN 96, Rev 1, entitled "Thomson Proposal Presentation", upload date Nov. 11, 2005.

Draft Minutes of the Waikoloa Interim Session of 802.22 Jan. 2006. Printed from www.IEEE802.22.org/22/ Contributions and Meetings Documents, Page group 35, Year 2006, DCN 23, Rev 0, entitled "802 22 WG Minutes Jan06", upload date Jan. 27, 2006.

* cited by examiner

APPARATUS FOR CONTROLLING CHANNEL SWITCHING IN WIRELESS NETWORKS

CROSS REFERENCE TO RELATED APPLICATIONS

This application claims the benefit, under 35 U.S.C. §365 of International Application PCT/US2006/048408 filed Dec. 19, 2006, which was published in accordance with PCT Article 21(2) on Jul. 19, 2007 in English and claims priority of U.S. Provisional patent application No. 60/757,998 filed Jan. 11, 2006.

FIELD OF THE INVENTION

The present invention relates to wireless networks and in particular to methods and apparatus for controlling channel switching in Wireless Regional Area Networks (WRAN).

BACKGROUND OF THE INVENTION

Demand for broadband communications access is increasing. Such access is difficult to provide in some cases. For example sparsely populated rural and other underserved areas of the world lack wired infrastructure to support wire-line broadband access. The Institute of Electrical and Electronics Engineers (IEEE) Wireless Regional Area Network (WRAN) working Group proposes a standard specification (designated 802.22) for wireless networks to meet the growing demand for wireless broadband access. The IEEE 802.22 WRAN specification describes a WRAN system configured to operate within radio frequency (RF) broadcast bands typically reserved for licensed users. One example of a licensed user in an RF broadcast band is a television broadcast station.

Channel switching is an important capability for WRAN. WRAN transceiver nodes switch operating channels to avoid interfering with licensed incumbent services in broadcast bands. WRAN nodes are capable of switching from a first channel, e.g. a channel on which a node has established a communication link, to a second channel when incumbent use is detected.

Another reason for WRAN channel switching is to maintain quality of service (QoS) on WRAN communication links. Link quality can degrade due to factors such as weather, electrical interference, damaged equipment and other factors. When link quality degrades it is sometimes desirable for a WRAN system change to a different channel to maintain link quality. Channel switching supports an option to establish a new communication link on a second, different channel if the first channel degrades.

Another reason for channel switching is to employ a spread spectrum communication technique known as frequency hopping (FH). Frequency hopping is another way a WRAN can avoid interfering with incumbents. Frequency hopping WRAN systems distribute communication in the time domain over a plurality of different frequencies. Each of the plurality of frequencies is used for only a small amount of time.

Incumbents are assigned relatively narrow frequency bands. Incumbents typically have rights to transmit at a power high enough to override a WRAN communication. Therefore, any interference caused by a WRAN on a given channel which affects the incumbent is transient. Any interference from a WRAN is likely to be overridden by the incumbent. At the same time, an incumbent overrides only one of the frequencies used by a frequency hopping WRAN station. Therefore, only one part of a WRAN transmission is disturbed by an incumbent arriving on a licensed channel.

One channel switching challenge for WRAN is avoiding channel collisions with other WRAN when switching channels. If more than one WRAN station selects the same second channel for switching at the same time a collision between WRAN stations can occur. Therefore, apparatus and methods for controlling channel switching to avoid channel collisions in WRAN systems are needed.

SUMMARY OF THE INVENTION

Embodiments of the invention provide methods, apparatus and systems for controlling channel switching in Wireless Regional Area Networks (WRAN).

BRIEF DESCRIPTION OF THE DRAWINGS

A complete understanding of the present invention is disclosed in the accompanying drawings in conjunction with the subsequent detailed description in which.

DETAILED DESCRIPTION OF THE INVENTION

Definitions

For purposes of this specification the following terms are used as defined herein.

The term "base station" (BS) refers to an equipment set providing connectivity, management, and control of at least one Customer Premised Equipment (CPE) set.

The term "customer premised equipment" (CPE) refers to equipment providing connectivity between a WRAN subscriber and a BS.

When referring to a WRAN the term "cell" is defined as comprising at least one BS.

The term "node" refers to a grouping of network elements that provides network related functions. For example a base station comprises a node of a WRAN. A CPE comprises a node of a WRAN.

The term "radio" refers to the wireless transmission of signals by modulation of electromagnetic waves with frequencies below those of light.

The term "cognitive radio" refers to a radio transmitter-receiver (transceiver) designed to detect whether at least a particular portion of a radio frequency (RF) spectrum is currently in use.

The term "channel" refers to a designated frequency or a designated band of frequencies for communicating between a sender and a receiver. A particular channel is indicated in a number of ways. A channel number represents an established channel number used by a medium access controller (MAC). In some embodiments a channel number refers a physical channel. In other embodiments or the invention a channel number indicates a logical channel. A channel number in one representation scheme can be mapped into various other representation schemes by hardware and software in sender and receiver stations.

The term "downstream" refers to the direction from a BS to the CPE. The term "Upstream" refers to the direction from a CPE to the BS.

The term "information" refers to the state of a system of interest.

The term "message" refers to information materialized and organized in accordance with a message format.

Figure 1:
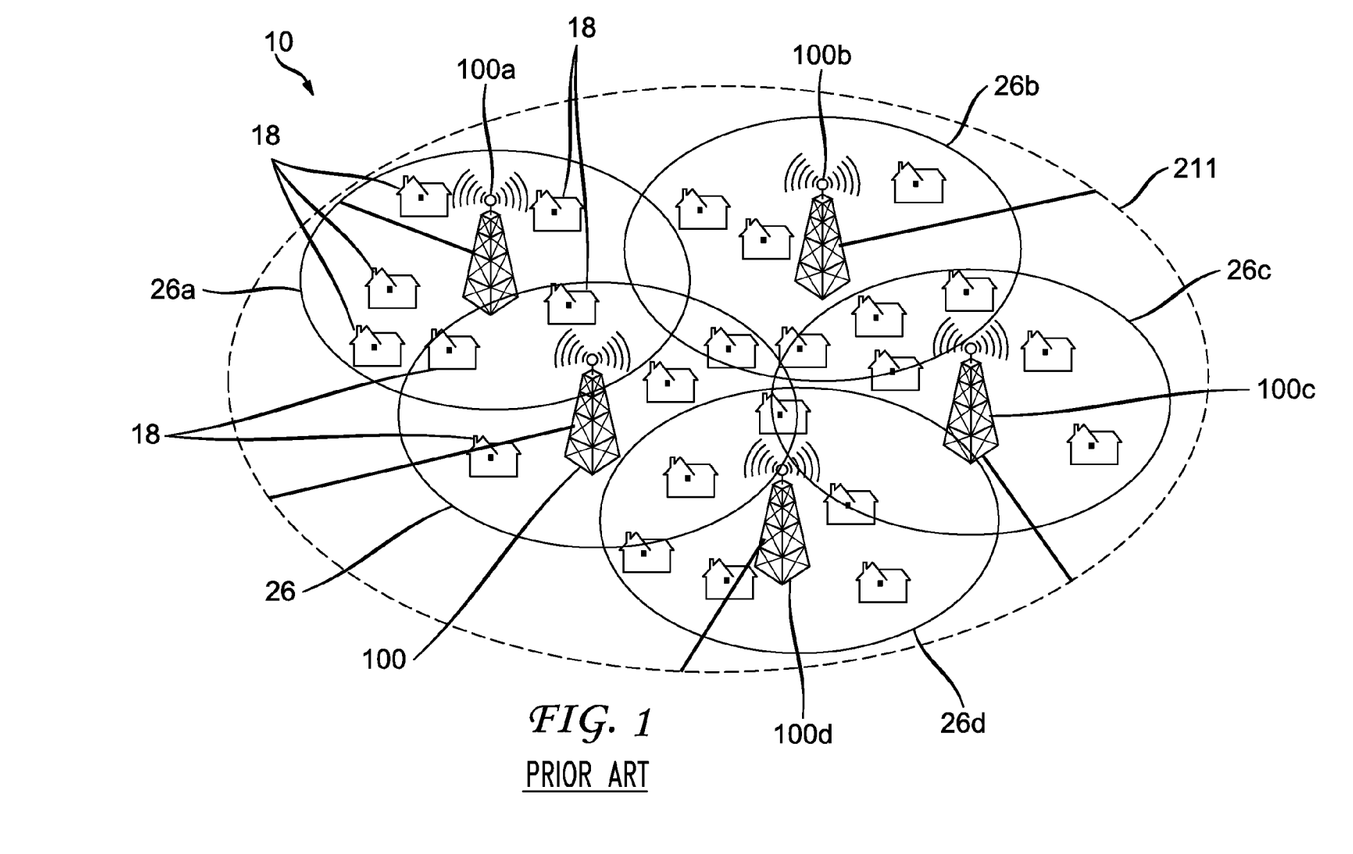
FIG. 1 is a pictorial diagram of an example WRAN system suitable for deploying embodiments of the invention.

FIG. 1 Wran

Figure 2:
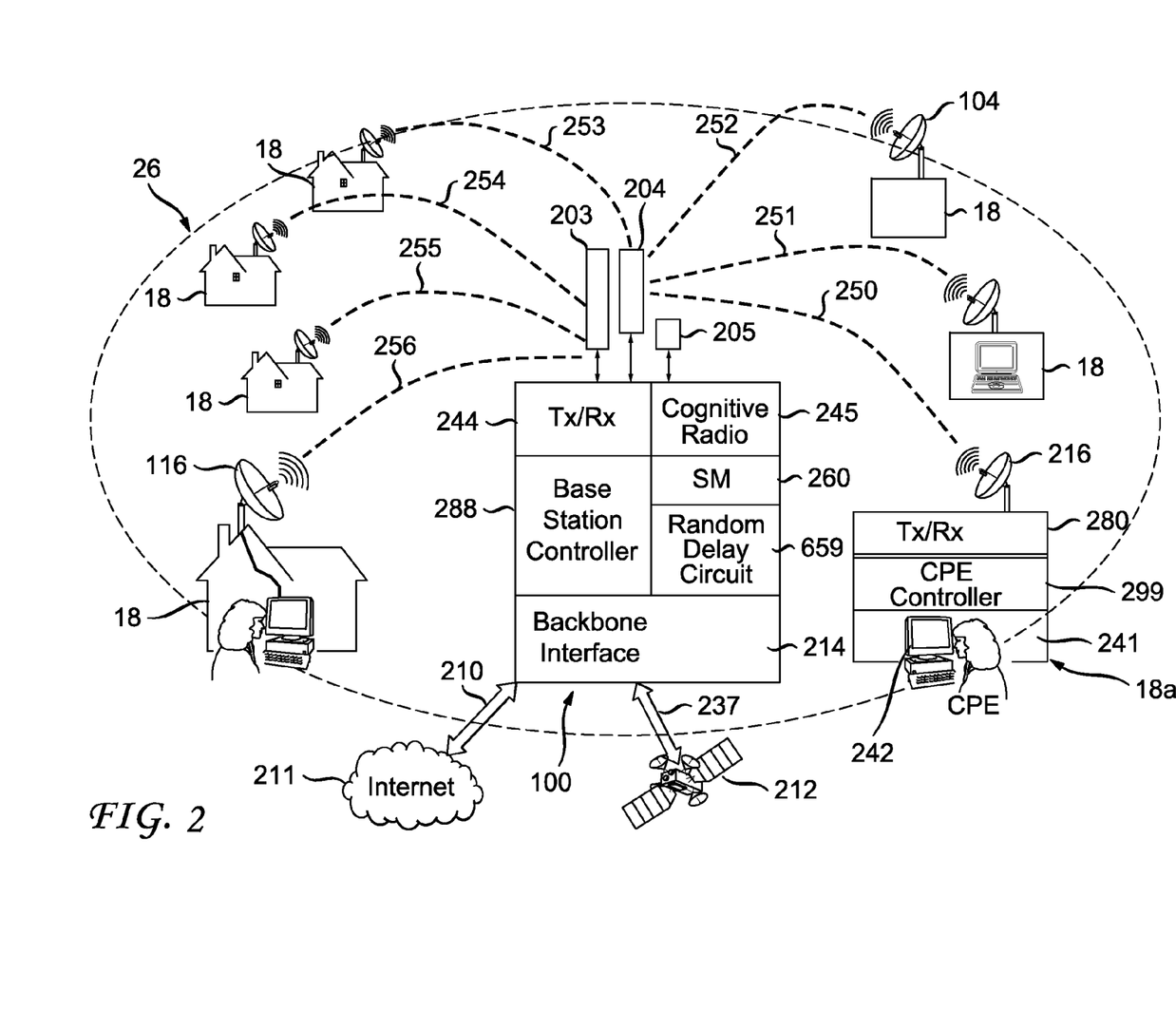
FIG. 2 is a pictorial diagram of an example WRAN cell according to an embodiment of the invention.
Figure 3:
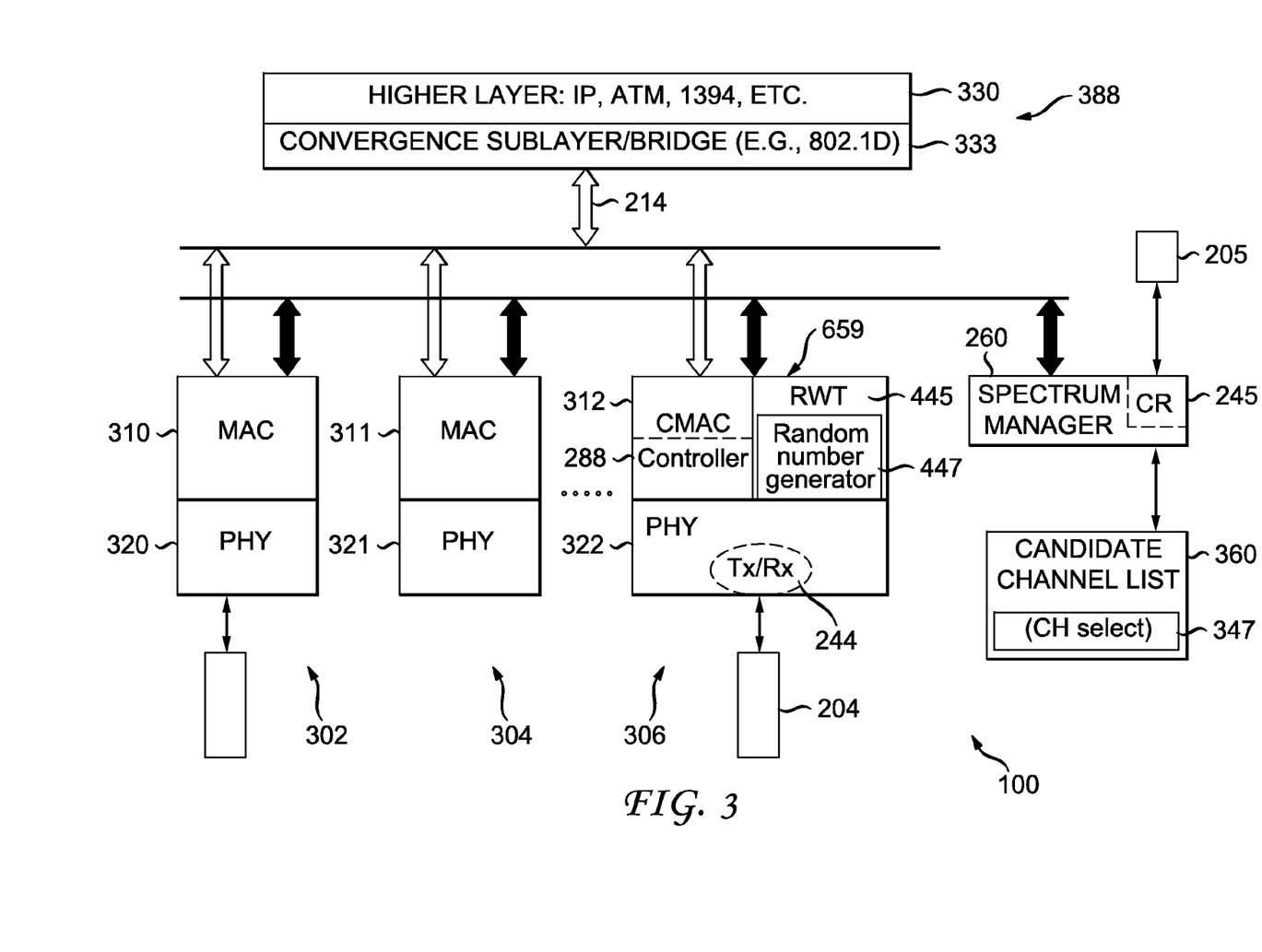
FIG. 3 is a block diagram of a BS according to an embodiment of the invention.
Figure 6:
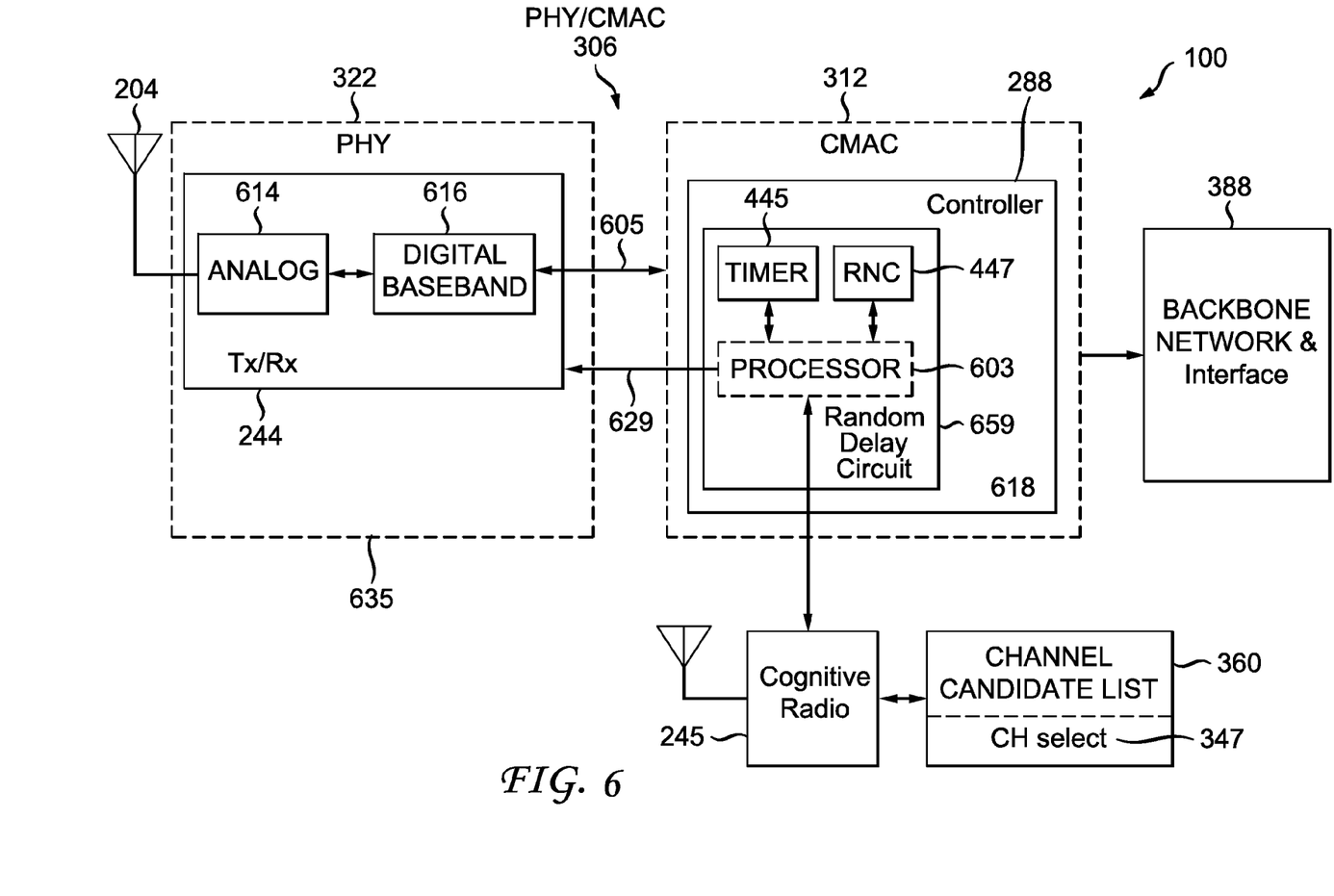
FIG. 6 is more detailed block diagram of embodiments of the invention as illustrated in FIGS. 2 and 3.

FIG. 1 illustrates an example wireless network 10 suitable for deploying the various embodiments of the present invention as illustrated in FIGS. 2, 3 and 6. FIG. 1 illustrates Network 10 as but one example of many possible network configurations suitable for deploying various embodiments of the invention. According to one embodiment of the invention wireless network 10 comprises a Wireless Regional Area Network (WRAN). General 20, specifications for WRAN are described, for example, in "IEEE P802.22/D0.1, Draft Standard for Wireless Regional Area Networks Part 22: Cognitive Wireless RAN Medium Access Control (MAC) and Physical Unit (PHY) specifications: Policies and procedures for operation in the TV Bands."

In one embodiment of the invention network 10 is configured generally according to proposed draft IEEE 802.22 specifications. Other embodiments of the invention are contemplated that are not described in present drafts of IEEE 802.22 specifications. These embodiments may, or may not be described in future 802.22 specifications. Regardless of 802.22 specifications WRAN 10 comprises at least one cell 26. A cell 26 comprises at least one base station BS 100. BS 100 is typically associated with at least one customer premised equipment (CPE) 18. Typically, a cell 26 comprises at least one BS 100 and at least one CPE 18. The example WRAN 10 illustrated in FIG. 1 comprises a plurality of cells 26 and 26 a-d. A plurality of CPE 18 comprises each cell 26 and 26a-d. At least one BS, e.g., BS 100 of a cell 26 is coupled to a backbone (BS) network 211. BB network 211 comprises a conventional wired broadband service. BS 100 couples CEDE 18 to BB network 211 via wireless link coupling CPE 18 and BS 100, and via wired link coupling BS 100 and BB network 211.

In some embodiments of the invention the service coverage of each cell 26 extends to a point where a transmitted signal from a BS 100 can be received by an associated CPE with a given minimum signal to noise ratio (SNR). In some embodiments of the invention service coverage of some cells 26 overlaps with service coverage of other cells 26 as illustrated in FIG. 1.

A typical example cell 26 comprises one BS 10.0 and a plurality of associated CPE 18. It is understood the number of cells 26, base stations 100 and CPE 18 illustrated in FIG. 1 are chosen for convenience of illustration and ease of discussion in this enabling specification. In actual practice the numbers of cells 26, BS 100 and CPE 18 of WRAN 10 will vary. The invention is not limited to WRAN comprising any particular number of cells 26, BS 100 or CPE 18.

Alternative configurations of networks suitable for deployment of the invention comprise WRAN systems including more than one WRAN 10. In that case the systems of WRAN 10 ideally avoid interfering with each other on communication channels as well as avoiding interfering with incumbent users of channels.

FIG. 2 Cell

FIG. 2 is a pictorial diagram of an example cell 26 of a WRAN 10 of the general type illustrated in FIG. 1. Cell 26 comprises at least one BS 100 and at least one CPE, for example CPE 18 and CPE 18a. The cell 26 example illustrated in FIG. 2 comprises a BS 100 and a plurality of CPE 18. BS 100 includes at least one transmit antenna and at least one receive antenna, indicated as transceiver antenna 203. Two example base station transceiver antennas 203 and 204 are illustrated in FIG. 2. The invention is not limited to any particular number of base station antennas. Transceiver antenna 203 is coupled to a transmitter and receiver (transceiver) 244. BS 100 further comprises a spectrum sensor antenna 205 coupled to a cognitive radio transceiver 245.

BS 100 further comprises a BS controller 288 and a backbone interface 214. Backbone interface 214 couples at least one backbone network to BS controller 288. FIG. 2 illustrates two examples of backbone networks. A first example of a backbone network comprises a conventional wire-line connection 210 to the Internet 211. A second example of a backbone network comprises a satellite communication link 237 to a communications satellite 212.

In one embodiment of the invention, BS 100 provides a wireless extension of broadband service carried by at least one backbone network, for example a satellite broadcast network 212, to users in a geographic region to which the satellite 212 broadcast service does not directly extend to a CPE 18. According to example embodiments back bone interface 214 of BS 100 comprises an interface between wireless and wire-line backbone networks. Other examples of wire-line backbone networks suitable for implementations of the invention include cable networks, fiber optics networks, public telephone networks, and the like. BS controller 288 is coupled to transceiver 244 to control operation of transceiver 244 to communicate with at least one CPE 19 of cell 26. Thus at least one communication link, for example, 250, is established between at least one backbone network, e.g. 211 and at least one CPE 18 of cell 26. In an example embodiment of the invention base station 100 and a plurality of CPE 18 are arranged in a point-to-multipoint network configuration. In that example BS 100 comprises a point and a plurality of CPE 18 comprise multi-points.

In one embodiment of the invention transceiver 244 of BS 100 of WRAN 10 operates on UHF/VHF TV bands between 54 and 862 MHz. According to other embodiments of the invention BS 100 of WRAN 10 utilizes other television bands for communication with CPE 18. In some embodiments of the invention BS 100 of WRAN 10 relies on guard bands for communication with CPE. Regardless of the channels and frequencies upon which a WRAN 10 or a BS 100 operates, an ideal WRAN 10 avoids interfering with use of any communication channel by an incumbent, i.e., a licensed user.

Example CPE 18a comprises at least one CPE transmit/receive antenna 216 coupled to a CPE transceiver 280. A CPE controller 299 is coupled to transceiver 280. CPE controller 299 is also coupled to a user application unit 241. User application unit 241 comprises, for example, a personal computer 242 and associated hardware and software. CPE controller 299 is coupled between user application unit 241 and transceiver 280 to provide a communication link 250 between user application unit 241 and at least one backbone network of BS 100.

BS 100 communicates with CPE, for example CPE 18a, via air communication link 250. Link 250 is established between at least one BS antenna, for example 204, and CPE antenna 216. Similar communication links between CPE 18 and BS 100 are indicated by dotted lines 251, 252, 253, 254, 255 and 256.

In one embodiment of the invention BS 100 broadcasts downlink transmissions to example CPE 18*a*. In one embodiment of the invention BS 100 downlink transmissions are received by all CPE 18, 18*a* comprising cell 26. In one embodiment a single up link from a CPE 18 to BS 100 is shared by a plurality of CPE of a cell 26. In some embodiments an uplink channel comprises a multiple access channel. In one embodiment of the invention each BS 100 controls its uplink transmissions by allowing access according to a specified Quality of Service (QoS) requirement.

In one embodiment of the invention controller 299 of example CPE 18*a* comprises a medium access controller (MAC). In some embodiments controller 299 employs conventional multiple access methods to share access with other CPE to a communication link among multiple CPE and a BS 100.

Three conventional methods for medium access control suitable for use in BS 100 and CPE 18 according to various embodiments of the invention are frequency division multiple access (FDMA), time-division multiple access (TDMA), and code-division multiple access (CDMA). In an FDMA embodiment the medium is divided into portions of spectrum referred to as channels. In a TDMA embodiment access to the medium is divided into portions comprising time slots. In a CDMA embodiment the medium is divided by codes through which assigned nodes can share the same channel of the medium.

One embodiment of the invention employs Orthogonal Frequency Division Multiple Access (OFDMA) techniques. In one OFDMA embodiment of the invention the medium is partitioned in the time frequency space. This is accomplished by assigning CPE along both an OFDM signal index and an OFDM sub-carrier index. In this embodiment BS 100 transmits symbols using sub-carriers that remain orthogonal to those of other CPE of cell 26. Some embodiments of the invention assign more than one sub-carrier to one CPE, for example to support high rate applications.

Other embodiments of the invention comprise alternative multiple access apparatus and schemes. Some embodiments of the invention are envisioned to employ combinations of at least two multiple access schemes for dividing the spectrum into portions. Regardless of the access scheme employed by the various embodiments of the invention, the invention provides a system and method for avoiding channel collision when switching channels.

According to some embodiments of the invention BS 100 optionally includes a spectrum sensor antenna 205. Spectrum sensor 205 is coupled to a spectrum management module 260. In one embodiment of the invention spectrum management module 260 (further illustrated in FIG. 3 at 260) comprises a cognitive radio system (best illustrated in FIG. 3 at 245). In one embodiment of the invention example CPE 18*a* provides distributed spectrum sensing capability for BS 100 of a cell 26. In that embodiment CPE 18 are equipped with a spectrum sensor antenna and spectrum manager in a like manner to BS 100.

In such an embodiment CPE are configured to perform local spectrum measurement. CPE 18 report local measurement results to BS 100. BS 100 collects the data from the CPE 18. BS 100 determines the presence of incumbents (e.g., licensed users) on sensed portions of the RF spectrum based upon information collected from CPE together with its own BS 100 measurements.

Unlike a typical BS, BS 100 of FIG. 2 further comprises a random delay circuit (RDC) 659 (also illustrated in FIG. 6 at 659). In one embodiment of the invention random delay circuit 659 comprises a portion of BS controller 288. In an alternative embodiment of the invention delay circuit 659 comprises a portion of transceiver 244. It is to be understood a variety of specific hardware and software implementations of the functions of BS 100 illustrated in FIG. 2 are possible. Therefore random delay circuit 659 is configurable in a wide variety of hardware and software components of BS 100. Regardless of hardware with which random delay circuit 659 is associated, circuit 659 avoids collisions on a second channel when BS 100 switches from a first channel to a second channel.

Each BS 100 and each CPE 18 of WRAN 10 comprises respective nodes of WRAN 10. In one embodiment of the invention all nodes are fixed nodes. According to alternative embodiments of the invention at least one node of network 100 is mobile.

According to the embodiment illustrated in FIG. 2 the wireless transmission medium coupling CPE 18 to a corresponding BS 100 comprises air. However the invention is not limited to application in an air medium. Other media for propagation of communication signals between nodes of a wireless network node are possible. For example it is known to propagate signals through liquid media such as water as well as through gases other than air and through near vacuums such as space.

Regardless of the medium through which signals in a cell 26 of a network 10 are propagated, each node of cell 26 shares access to the medium with at least one other node of the cell 26. Accordingly embodiments of the invention comprise protocols and circuits for sharing access to the medium by nodes of a cell 26 of network 10.

FIG. 3 Base Station 100

FIG. 3 is a high level block diagram of a BS 100 as illustrated in FIGS. 1 and 2. FIG. 3 depicts BS 100 in accordance with an Open Systems Interconnection Reference Model (OSI-RM) representation of the invention. BS 100 comprises at least one physical-medium access control interface (PHY/MAC) module, e.g., module 306. Other embodiments of the invention comprise a plurality of PHY/MAC modules (e.g., 302, 304 and 306) as illustrated in FIG. 3.

A PHY/MAC module (302,304,306) comprises a medium access control unit (MAC 310,311,312) and a physical unit (PHY 320, 321,322). An example MAC 312 of PHY/MAC unit 306 comprises a cognitive medium access controller (CMAC) 312. CMAC unit 312 comprises a transceiver controller, e.g. controller 288. Transceiver controller 288 of MAC 312 is coupled to transceiver 244 of PHY unit 322 for controlling channel switching of BS 100.

PHY unit 322 comprises transceiver 244. According to embodiments of the invention PHY unit 322 further comprises conventional electrical, mechanical, and procedural interfaces (not shown) to the air transmission medium comprising portions of the RF spectrum used by BS 100 for communication with CPE 18. Example PHY unit 322 comprises a transceiver 244 coupled to a radio frequency (RF) antenna 204. Transceiver 244 transmits bits through an air medium over a communication link (illustrated, e.g., in FIG. 2 at 250) between a BS 100 antenna 204 and a CPE 18 antenna, e.g., antenna 216 of FIG. 2.

Together PHY unit 322 and MAC unit 312 define an interface between physical components and medium access control functions of BS 100. According to an embodiment of the invention a PHY/MAC module 306 conforms to a draft IEEE 802.22 standard specification. Example PHY/MAC unit 306 establishes a communication link between BS 100 and CPE 18 (best illustrated in FIG. 2). According to some embodiments of the invention at least one PHY/MAC module (302, 304,306) further establishes communication between BS 100 and a second BS (example illustrated in FIG. 4) to provide inter base station communication.

According to an embodiment of the invention BS 100 further comprises a backbone network interface 388. Backbone network 38E comprises bridge unit 333 and protocol unit 330. Bridge unit 333 and protocol unit 330 define an interface between BS 100 and a wired, or other wireless network. In turn, PHY/MAC unit 306 of example BS 100 couples CPE 18 to a backbone network via backbone network interface unit 388.

According to embodiments of the invention CMAC unit 312 includes a controller 288 coupled to transceiver 244 of PHY unit 322 to control channel selection and switching of BS 100. Transceiver 244 is coupled to antenna 204. A communication link (e.g., 250 illustrated in FIG. 2) is established through an air medium between a CPE antenna (e.g. 18a of FIG. 2) and BS 100 antenna 204. Thus BS 100 provides access to a backbone network for CPE 18. Controller 288 includes a random delay circuit 659. According to some embodiments of the invention random delay circuit 659 comprises a random wait timer 445 and a random number generator 447. The configuration and operation of controller 288 is discussed in further detail with respect to FIG. 6.

FIG. 3 illustrates three PHY/MAC modules 302, 304 and 306 for ease of discussion. However, as indicated by dashed lines, the invention is not limited with respect to the number of PHY/MAC modules in a BS 100. Embodiments of the invention comprising more or fewer PHY/MAC modules than are illustrated in FIG. 3 are possible. Further embodiments of BS 100 are configurable to add PHY/MAC modules as BS demand increases. Therefore the architecture of BS 100 illustrated in FIG. 3 is scalable according to some embodiments of the invention.

According to an embodiment of the invention PHY 322 further incorporates a cognitive radio transceiver (illustrated separate] at 245). According to some embodiments of the invention CMAC 312 cooperates with a cognitive radio (CR) 245 to comprise a Cognitive Radio MAC (CMAC) 312. CR 245 is configured to sense at least a portion of the radio frequency spectrum. An example spectrum sensing technique employed by CR 245 is carrier sensing. However the invention does not rely on a particular spectrum sensing technique. Other spectrum sensing techniques are suitable for use in the invention. In CMAC embodiments CR 245 enables BS 100 to determine communication channel conditions, for example, channel occupancy, link quality and other channel parameters related to the RF spectrum.

In some embodiments of the invention CMAC 312 is configured to control transceiver 244 based on spectrum information provided by CR 245. In response to sensed channel conditions CMAC 312 switches transceiver 244 into (or out of) portions of the RF spectrum (e.g. channels). One reason for switching is to avoid interfering with licensed incumbent users of the RF spectrum.

Some CMAC embodiments of the invention support unicast (addressed to a single CPE), multicast (addressed to a group of CPEs) and broadcast (addressed to all CPEs in a cell) services. In particular for some embodiments capable of spectrum measurement activities, multicast management connections are employed. Some embodiments of the invention provide clustering algorithms to be implemented and the measurement load to be shared. These algorithms will vary by vendor and application.

Various CMAC embodiments implement a combination of access schemes that control contention between CPE for access to BB network 388. At the same time CMAC 312 provides bandwidth appropriate for each CPE application. CMAC 312 accomplishes this through at least one of four different types of upstream scheduling mechanisms. In some CMAC embodiments these mechanisms are implemented using at least one of unsolicited bandwidth grants, polling, and contention procedures. Some embodiments of BS 100 and CMAC 312 employ polling to simplify access to BB network 388.

Polling ensures CPE applications receive service on a deterministic basis. For example, real-time applications like voice and video sometimes prefer service on a uniform basis. At other times these applications prefer a very tightly controlled schedule. In contrast, data applications are typically more delay tolerant than voice and video applications. Hence contention techniques are typically used in data applications. This avoids individual polling of CPE. Contention has the further advantage of conserving resources. Some embodiments of the invention avoid polling CPE that have been inactive for a long period of time. Some CMAC 312 embodiments of the invention dynamically create, delete, and change connections as the need arises.

Spectrum Manager

According to an embodiment of the invention SM 260 provides spectrum management capabilities to WRAN 10. Spectrum manager 260 supports cognitive radio (CR) MAC (CMAC) embodiments of the invention. According to some embodiments of the invention SM 260 is implemented by a programmable logic device. Other hardware and software devices for implementing SM 260 are contemplated. Therefore the invention does not rely on any particular hardware or software implementation of SM 260.

In some embodiments of the invention SM 260 is coupled to a cognitive radio 245 and includes a sensor, for example antenna 205. For typical embodiments of the invention antenna 205 is located in physical proximity to BS 100. Accordingly, spectrum antenna 205 senses parameters of the spectrum and operating environment in a vicinity of BS 100. CR 245 analyzes spectrum parameter changes based on information sensed and provided by antenna 2205. Examples of parameters sensed by antenna 205 and processed by SM 260 (processor not illustrated) include for example parameters selected from the group comprising: radio frequency spectrum activity, interference level within the radio frequency spectrum, CPE behavior, and WRAN state information, to name but a few examples.

In one embodiment of the invention spectrum manager 260 of BS 100 maintains a candidate channel list 360. In an embodiment of the invention candidate channel list 360 is stored in a memory (also represented by 360). Suitable memory apparatus for storing candidate channel list 360 include, but are not limited to, conventional random access memory (RAM) types. In other embodiments of the invention candidate channel list 360 comprises other storage media suitable for storing and updating channel list information.

An example candidate channel list comprises at least one frequency, e.g., a channel [CHselsect] 347 available for BS 100 switching. In one embodiment candidate channel list 360 is compiled based, at least in part, on sensed spectrum parameters as described above. In one embodiment of the invention SM 260 associates one of a high, medium, and low preference to at least one candidate channel comprising channel candidate list 360 of a BS 100.

In some embodiments of the invention geographical spectrum state information, provided for example by Government (GSSI) provides information to SM 260. SM 260 uses the GSSI information to compile candidate channel list 360. In that case GSSI provides at least a portion of the input information for dynamic frequency selection (DFS) by BS 100. In one embodiment of the invention GSSI is obtained by base node 100 via backbone interface 388. In other embodiments of the invention BS 100 receives GSSI via an air communication link provided by, for example, antenna 204 and transceiver 244.

According to one embodiment of the invention at least one BS 100 of WRAN 10 includes a GPS (global positioning system) receiver (not shown). A GPS receiver is configured to determine the geographical location of BS 100. The BS 100 location information determined by the GPS receiver is forwarded by BS 100 to a centralized server. A suitable centralized server comprises for example, a server managed by Federal Communications Commission FCC in the United States of America. The centralized server responds by providing the BS 100 with information about TV unoccupied channels in the area of BS 100 BS. In such an embodiment candidate channel list 360 is based at least in part upon information received by the BS 100 in response to sending BS 100 location information.

Alternative embodiments of the invention are implemented based on local spectrum sensing by at least one CPE 18 of a cell 26 of a WRAN 10. In local spectrum sensing embodiments a CPE 18 includes at least one local spectrum sensor configured to sense channels available to the CPE. According to some embodiments of the invention BS 100 employs various combinations of GPS, local spectrum sensing by CPE, and other approaches to determine channels comprising candidate channel list 360.

In embodiments of the invention spectrum manager 260 further comprises a processor (not shown) coupled to cognitive radio 245 for carrying out user specified spectrum analysis algorithms on parameters sensed by sensor 205. For example in one embodiment of the invention SM 260 is configured to detect an interference situation (e.g., with incumbents or other 802.22 cells) based upon sensed parameters. In that case SM 260 provides a signal to MAC 312 to indicate detection of the interference situation. MAC 312 initiates appropriate actions by BS 100 to resolve the conflict situation.

In some cases an appropriate action for BS. 100 is to perform a channel switch. A channel on which BS 100 has established communication and which is presently in use by BS 100 is referred to herein as a current operating channel (Cop). Therefore a first channel comprises a current operating channel in some embodiments of the invention. A second channel is a channel to which BS 100 intends to switch. Therefore, a second channel comprises a candidate channel [CHselect] in some embodiments of the invention.

Embodiments of the invention employ dynamic frequency selection (DFS) techniques to select a channel for switching to avoid interfering with an incumbent's use of the current operating channel. DFS techniques select an alternative channel [CHselect] in response to channel conditions on an operating channel. In some cases sensed parameters indicate the arrival of an incumbent on an operating channel. In that case SM dynamically responds to the change by selecting a new channel [CHselect] for operation of BS 100.

Some embodiments of the invention support frequency hopping (FH) for channel collision avoidance. Frequency-hopping is a method of transmitting radio frequency signals by switching a radio frequency carrier among a plurality of frequency channels. Frequency hopping is employed, for example, to avoid in-band quiet periods. Another application for frequency hopping is to provide better Quality of Service (QoS) to certain traffic types, e.g., voice traffic. The present invention is suitable for use in each of these, and other frequency hopping applications.

To switch channels (i.e., hop frequencies), SM 260 selects CHselect based on channel selection criteria. Channel selection criteria include, but are not limited to, the number of CPE associated with a BS, the average CPE range from a BS, and traffic type on available channels. In response to SM 260 MAC 312 initiates a channel switch for BS 100 via transceiver controller 288 of MAC 312. According to one step in an example switching operation MAC 312 provides CHselect to transceiver 244 via controller 288.

According to one frequency hopping embodiment of the invention BS 100 maintains at least two channels for communication with CPE. A first channel comprises the operating channel Cop. A second channel comprises the candidate channel Cca. BS 100 operates on the operating channel Cop. However, BS 100 switches to the candidate channel Cca when BS 100 senses operating channel Cop. In some embodiments of the invention BS 100 also senses neighboring channels of operating channel Cop during a sensing operation. According to one embodiment of the invention when BS 100 wants to sense its current operating channel Cop, BS 100 sends a channel switch and sensing message (CSS) to associated CPE 18.

BS 100 switches to the candidate channel Cca for transmitting data to CPE and other signaling operations. At the same time, BS 100 senses the operation channel Cop. After sensing Cop, BS 100 switches back to the operating channel Cop if there is no incumbent or other BS operating in Cop. However, BS 100 and a different BS (not shown) can frequency hop to the same channel Cop in some situations. For example BS 100 and another BS frequency can hop to the same Cop before the two BS are able to detect a conflict. In that case a collision occurs on channel Cop. According to embodiments of the invention controller 288 of CMAC 312 avoids this type of collision problem.

Subunits 330,333

As illustrated in FIG. 3 at least one of MAC 310, 311 and 312 is coupled to at least one backbone network by a backbone interface 388. Backbone interface 388 comprises higher level units 330 and 333 of BS 100. More than one network unit technology is supportable by backbone interface 388 of BS 100. According to embodiments of the invention at least one higher level unit of BS 100 implements Internet Protocol (IP) communication links. Therefore, according to some embodiments of the invention backbone interface 388 couples BS 100 to the Internet. In one embodiment of the invention, Backbone interface 388 is coupled to an Internet Service Provider (ISP) backbone network by Ethernet cable. In that manner Internet Service for accessing Internet 111 by CPE 18 (illustrated in FIGS. 1 & 2) is provided by BS 100.

In other embodiments of the invention backbone interface 388 wirelessly couples BS 100 to a (e.g., satellite 212 of FIG. 2) via a satellite communication link established by backbone interface 388 and satellite transceiver equipment. Other embodiments of transmission medium comprising backbone interface 388 include, but are not limited to, fiber optic coupling and coupling by microwave point to point transmission equipment.

Channel Collision Avoidance

Figure 4:
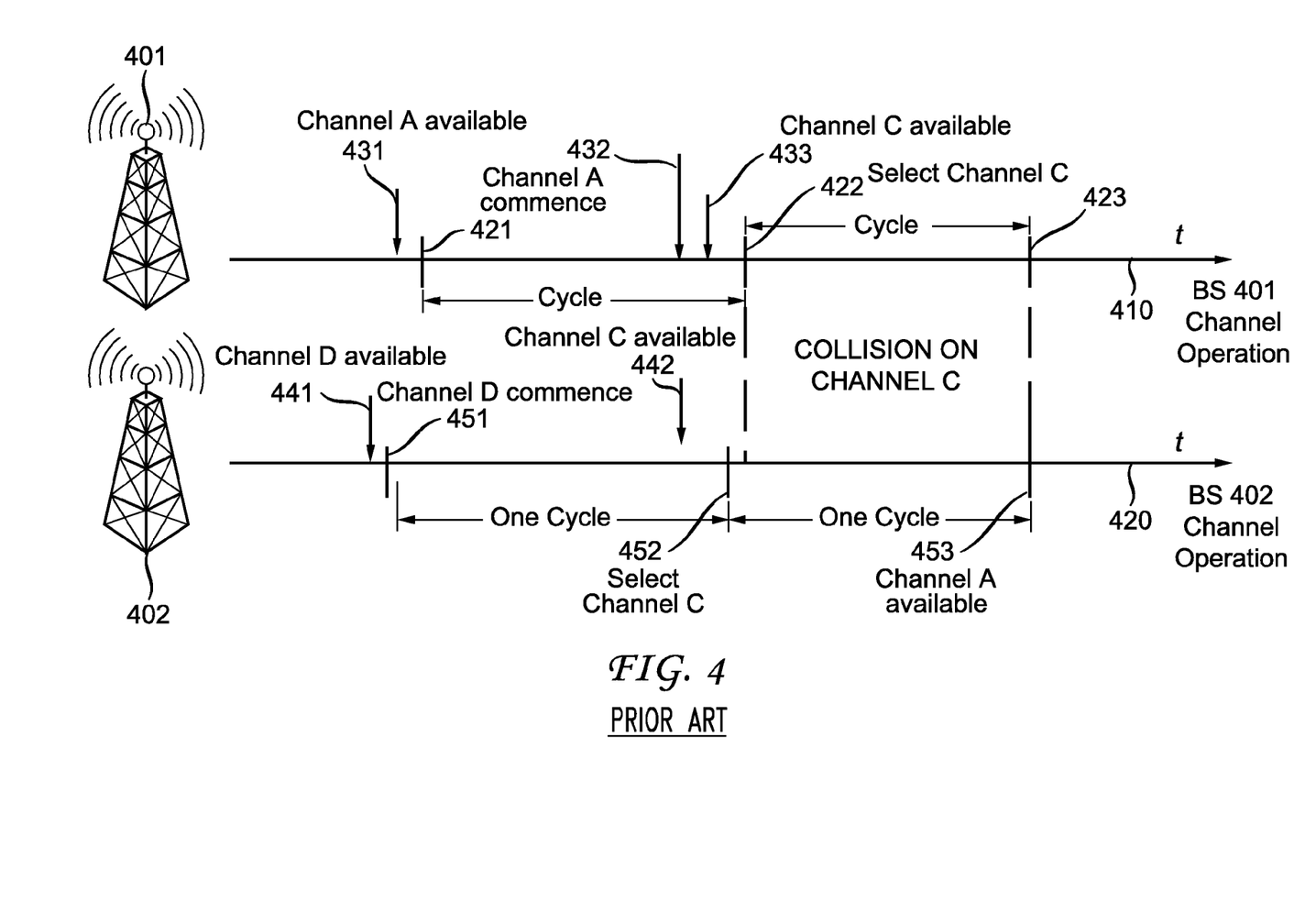
FIG. 4 is diagram illustrating a WRAN switching problem.

FIG. 4 depicts two example Base Stations BS 401 and BS 402 to illustrate a collision scenario. First BS 401 and second BS 402 perform the actions described below at times indicated on respective timelines 410 and 420. For timelines 410 and 420, time t advances in the direction of the arrows.

Dynamic frequency hopping (DFH) operation periods for BS 401 include a first time period indicated along timeline 410 between markers 421 and 422. A second DFH operation period for BS 401 is indicated between markers 422 and 423. Example DFH operation periods for BS 402 comprise a first BS 402 time period indicated along timeline 420 between markers 451 and 452. A second DFH operation period for BS 402 is indicated between markers 452 and 453.

At the start of timeline 410 BS 401 is operating on a channel (not indicated). At an example time indicated at 431, BS (401) validates channel A is available. At time 421 BS 401 commences operation on channel A. At the same time BS. 401 is operating on channel A, BS 402 senses channels [0, A−n] and [A+n, N], where n is a single channel increment and N is the number of channels to be sensed. At the start of timeline 420 BS 402 is operating on an example channel X (not indicated). At an example time indicated at 441, BS 402 validates a different channel, Channel D, is available. At example time 451 BS 402 commences operation on channel D. While BS 402 is operating on channel D. BS 402 senses on channels [0, D−n] and [D+n, N].

BS 401 detects the availability of channel C at time 433. BS 402 detects the availability of channel C at time 442. As illustrated in FIG. 4 the channel C validation time of BS 401 is close in time to the channel C validation time of BS 402. In this case it is possible BS 401 and BS 402 will each independently select channel C to be used in their next DFH operation period (422 and 452 respectively). The DFH operation periods of BS 401 and BS 402 are overlapped with each other. If both BS 401 and BS 402 hop to channel C in their overlapped DFH operation periods, collision on channel C occurs. The occurrence of the channel-use collision is due to the fact that neither BS 402 nor BS 401 knows about the frequency selected by the other. Typically, such channel-use information is only detected by a cognitive radio when a potential collision channel is actually in use.

Figure 5:
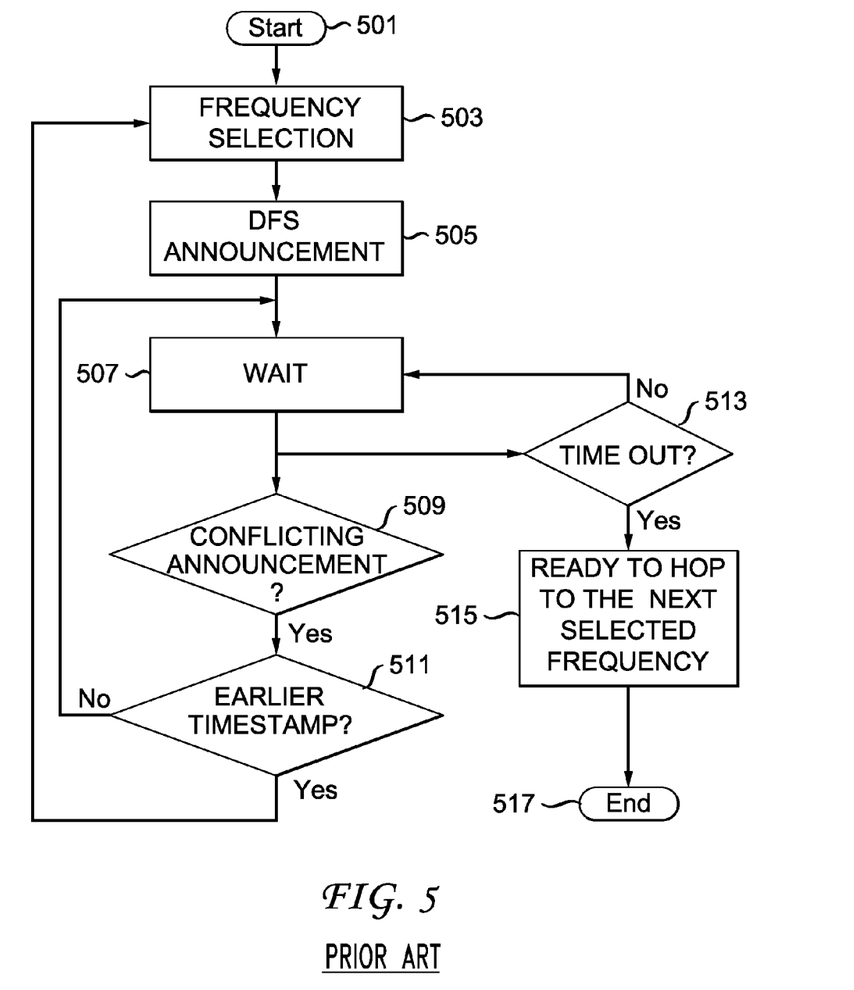
FIG. 5 is a flowchart illustrating steps of a conventional method for avoiding channel collisions.

One proposed solution to this collision problem is illustrated in FIG. 5. This solution relies on transmission and reception of channel information via a Dynamic Frequency Selection (DFS) announcement. A DFS announcement must be transmitted from a switching BS of WRAN to other BS of WRAN to notify other BS and WRAN of the selected channel. FIG. 5 illustrates an example method for a first BS of a WRAN system to select a frequency and switch to a new channel for operation. The method starts in normal operation of the first BS at step 501. The first BS selects a next hopping frequency as illustrated in step 503.

The first BS announces its selected next frequency to other BS, for example to a BS of another WRAN in step 505. Announcement is made by the first BS transmitting a message to other WRAN in some embodiments of the invention. After transmitting the announcement in step 505 the first BS waits for a predetermined delay period, as illustrated in steps 507 and 513. In one embodiment of the invention a fixed delay period is counted by a delay timer during a wait step 507. While the delay timer is counting a fixed delay, the first BS listens for conflicting channel announcements from other BS, for example from BS of other WRAN stations. If the delay timer times out in step 513 with no conflicting announcement received by the first BS in step 509 the first BS is ready to hop (switch) to the selected next channel, as illustrated in step 515. In that case the method ends at 517.

If the first BS receives a DFS announcement from a second BS announcing the same next frequency selected by the first BS a conflict is detected at step 509. Since both BS have selected the same frequency for hopping, there will be a collision if both BS hop to their announced frequency.

In that case, the method proceeds to step 511. In step 511 the first BS compares its own DFS announcement timestamp to the timestamp of the DFS announcement of the second BS. If the second BS timestamp is later than the first BS timestamp, the first BS proceeds to its selected next frequency in the next DFS operation period after the wait period has expired. If the second BS timestamp is earlier than the timestamp of the first BS the first BS returns to step 503 to select a different next frequency for hopping. Then the method repeats for the new selected next frequency.

The method illustrated in FIG. 5 has a drawback. Successful employment of the method relies on neighboring BS to reliably receive and decode each other's DFS announcements. Sometimes conditions interfere with reliability of transmission and reception of DFS announcements. If that occurs it is possible for collisions between the first and second BS to occur on a channel. Therefore, systems and methods that avoid such collision problems without relying on message transmission between BS are desirable.

Solution to Channel Collision Problem

Solutions to the channel collision problems described above are provided by apparatus according to embodiments of the invention. These embodiments are further illustrated in FIG. 6. Embodiments of the invention do not rely on message transmission and reception between BS to avoid channel collisions. FIG. 6 illustrates further details of the invention illustrated in FIGS. 2 and 3. As described above with respect to FIG. 3, FIG. 6 illustrates embodiments of the invention comprising at least one WRAN 10. WRAN 10 comprises at least one cell. A cell comprises at least one BS 100. BS 100 comprises at least one PHY/MAC module 306 coupled to at least one backbone network 388. PHY/MAC module 306 is further coupled to at least one transmit/receive antenna 204 to communicate via an air interface with at least one CPE (best illustrated in FIG. 2). According to embodiments of the invention PHY/MAC module 306 is configured to communicate with other BS of other WRAN cells.

PHY/MAC module 306 comprises at least one PHY unit 322. PHY unit 322 comprises at least one transceiver 244 coupled to at least one RF transceiver antenna 204. Transceiver 244 of PHY 322 comprises analog section 614 and digital base-band section 616. Transceiver 244 is operable to transmit and receive radio frequency signals on at least a portion of a radio frequency spectrum via a wireless transmission medium such as air. Analog unit 614 comprises a typical radio frequency transceiver front end. For example analog unit 614 provides conventional front end circuits such as signal amplifiers, modulators and demodulators for RF carrier signals transmitted and received via antenna 204.

In one embodiment of the invention analog unit 614 is operable to transmit and receive radio signals in full duplex mode. In an alternate embodiment of the invention analog unit 614 is operable to transmit on a transmit channel and to receive on a receive channel. In that embodiment transmit and receive channels are different channels.

Transceiver 244—Receive Mode

Signals are transmitted for example, from CPE 18 (illustrated in FIG. 2) to BS 100. As illustrated in FIG. 6, in receive mode BS 100 receives signals from CPE and provides information represented in the received signals to backbone network 388. To accomplish this transceiver 244 receives a modulated RF signal from antenna 204. Transceiver 244 provides a down converted analog signal to a base-band unit 616. Base-band unit 616 receives the down converted analog signal from analog unit 614 and converts the analog signal to a digital signal.

According to an OFDM implementation of the invention transceiver 244 receives an OFDM signal. The time domain signal is processed by a fast Fourier transformer (not shown) of transceiver 244 to transform the time domain signal into the frequency domain where the sub-channel data is extracted and the QAM values decoded.

In one embodiment of the invention base-band unit 616 receives a single input base-band signal from analog unit 614. Base-band unit 616 converts the analog signal to a digital signal. Base-band unit 616 typically includes a base band processor (not shown). According to an embodiment of the invention the base-band processor processes the single input digital base-band signal as a plurality of sub-band input digital base-band signals to provide a single bit stream to CMAC 312 at output 605. In one embodiment of the invention base-band unit 616 includes digital filters (not shown). The digital filters separate a digital base-band signal into sub-band digital base band signals. Output 605 of base-band unit 616 is coupled to CMAC 312. CMAC unit 312 provides the signals to backbone interface 388.

Transmit Operation

In the embodiment illustrated in FIG. 6, CMAC unit 312 includes a transceiver controller 288. During a transmit operation digital base-band unit 616 receives an output communication bit stream from CMAC 312. Base-band unit 616 encodes the communication bit stream. Base-band unit 616 provides a digital base-band signal to transceiver 244 analog section 614.

Various embodiments of PHY unit 322 and transceiver 244 implement conventional Orthogonal Frequency Division Multiplexing (OFDM) techniques. In these embodiments digital base-band unit 616 is configured to encode digital data provided by CMAC 312 in a plurality of sub-channels. In one embodiment of the invention subchannels comprise the sub-channels defined in IEEE 802.22 WRAN specification. In one embodiment of the invention, PHY 322 further comprises a modulator (not shown) configured for conventional quadrature amplitude modulation (QAM). In that case amplitude and phase together represent encoded data.

In one embodiment CMAC 312 sub-channel data is processed by an inverse fast Fourier transform unit (not shown) of PHY 322 to combine sub-channel data in a time domain signal. The time domain signal covers a frequency bandwidth substantially equivalent to the sum of the bandwidths or sub-channel spacing of each of the sub-channels. This time domain signal is then transmitted by antenna 204 on the operating frequency (Cop) of BS 100.

In an embodiment of the invention CMAC 312 initiates switching from a present operating channel to a next channel by transceiver 244. According to embodiments of the invention a mixer of transceiver 244 is adjusted in response to signals provided by CMAC 312 to switch channels.

Cognitive MAC

According to an embodiment of the invention MAC 312 of PHY/MAC module 306 comprises a cognitive MAC (CMAC) unit. According to some embodiments of the invention CMAC unit 312 is coupled to a cognitive radio 245. In other embodiments of the invention transceiver 244 of PHY 322 comprises a cognitive radio transceiver. As discussed above with respect to FIG. 3 CR 245 comprises a spectrum manager in one embodiment of the invention. In the embodiment illustrated in FIGS. 3 and 6 CR 245 maintains a candidate channel list 360.

CMAC 312 includes a transceiver controller 288 coupled to transceiver 244 of PHY 322 for controlling channel switching of transceiver 244. In one embodiment of the invention transceiver controller 288 comprises a random delay circuit (RDC) 659. In one embodiment of the invention RDC 659 comprises a random wait timer 445, a random number generator 447 and a processor 603.

In an example operation, CR 245 senses portions of the RF spectrum. If CR 245 detects incumbent users or other WRAN BS in a current operating channel (Cop) of BS 100, BS 100 selects a channel (CHselect) 347 from candidate channel list 360. According to some embodiments of the invention CHselect 347 is selected randomly from a list of channels comprising channel candidate list 360. According to alternative embodiments of the invention CHselect 347 is selected based on a user defined selection algorithm executed by a processor of spectrum manager 260 (best illustrated in FIG. 3.)

Regardless of how CHselect 347 is chosen, upon selecting CHselect; RDC 659 determines a random wait time, $t_{Rwait}$. In one embodiment of the invention RDC 659 includes a random number generator (RNG) 447. In that case a processor 603 of RDC 659 determines $t_{Rwait}$ based upon a random number provided by a random number generator 447. According to one embodiment of the invention CMAC determines $t_{Rwait}$ based upon a random number provided by RNG 447, and further based upon a minimum wait time $[t_{min}]$. In one embodiment of the invention $[t_{min}]$ is determined to be the time for a channel switch announcement to be transmitted from BS 100 to its associated CPE.

In other embodiments of the invention CMAC 312 determines $t_{Rwait}$ based upon a random number generated by RNG 447 and a maximum wait time $[t_{max}]$. In some embodiments of the invention processor 603 selects $t_{Rwait}$ based upon a random number generated by RNG 447 and also chosen to fall within a window defined by $[t_{min}]$ and $[t_{max}]$. According to an embodiment of the invention RDC 659 starts a wait timer RWT 445 with $t_{Rwait}$ as the expiration time of timer 445.

Before BS 100 switches to CHselect, cognitive radio 245 senses CHselect for incumbent signals and for signals from other WRAN systems arriving after the last update of Channel candidate list 360. If the channel CHselect is still idle/available at the expiration of $t_{Rwait}$, controller 288 provides a signal to transceiver 244 to change channel from Cop to CHselect. However, if CR 245 detects incumbent signals or other WRAN systems in CHselect, CMAC 312 selects another channel CHselect from candidate channel list 360 (or its previous Cop if the previous Cop is not occupied by incumbents.)

In accordance with an embodiment of the invention CMAC 312 provides control signals for adjusting characteristics of analog unit 614 and base-band unit 616 to switch transceiver 244 from a first channel to a second channel. For example the center frequencies and the bandwidth of analog unit 614 and characteristics of digital base-band unit 616 are adjusted by CMAC 312 to switch from an operating channel (Cop) to a selected channel (CHselect).

According to an embodiment of the invention CMAC 312 comprises circuits implementing conventional functions exemplified by medium access controllers according to an IEEE 802.11 standard. However, in contrast to conventional medium access controllers, CMAC 312 of the invention comprises a transceiver controller 288 implementing various embodiments of the invention. Controller 288 comprises random delay circuit 659. Random delay circuit 659 comprises a random number generator 447, a processor 603 and a timer 445. Controller 288 avoids channel collisions when BS 100 switches from a first channel to a second channel.

Figure 7:
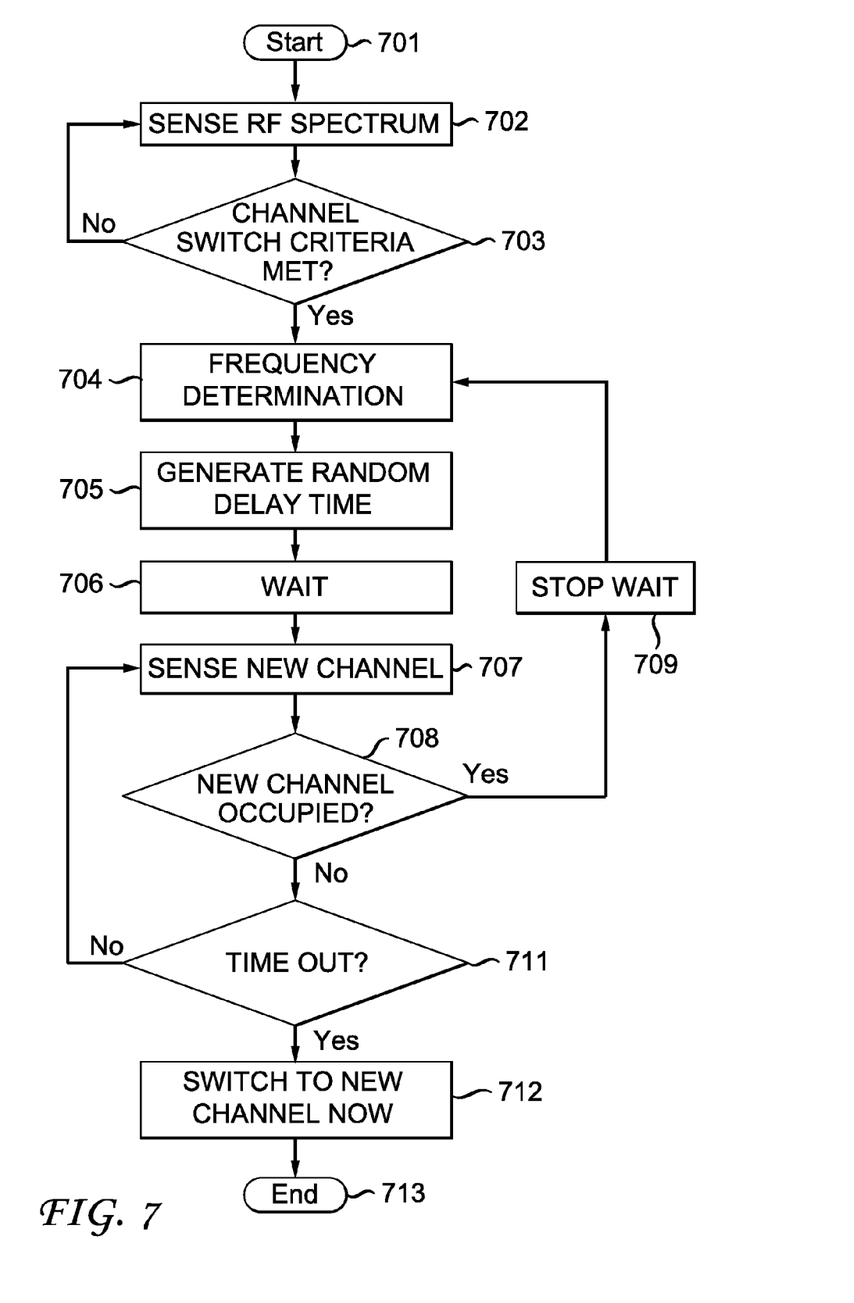
FIG. 7 is a flowchart illustrating steps of a method according to an embodiment of the invention for avoiding channel collisions.

An embodiment of the invention avoids collisions without the need to transmit or receive DFS announcements. A method according to this embodiment of the invention is illustrated in the flowchart of FIG. 7. The method according the embodiment illustrated in FIG. 7 avoids channel collision without the need to announce channel changes to neighboring base stations. The steps of the method are as follows. In step 701 BS 100 of an example WRAN 10 operates in an operating channel (Cop). At step 702 a cognitive radio comprising a spectrum manager senses the operating channel to determine if channel switching criteria are met. An example of a channel switch criteria is the sensed arrival of an incumbent on the operating channel (Cop). If arrival of an incumbent is sensed on the operating channel BS 100 selects a new frequency (CH select) frequency for switching at step 704.

In step 705 a random delay time is generated. In one embodiment of the invention the step of generating a random delay time is carried out by a step of generating a random number. In one embodiment of the method of the invention a random delay time for step 705 is based upon a random number generated by a random number generator. BS 100 waits in step 706 for the expiration of the random delay time. In one embodiment of the invention BS initiates, during the wait step 706, a step of sensing the selected channel (CHselect) to determine if the selected cannel is still available by the expiration of the random delay time.

In one embodiment of the invention the wait step is carried out by a step of setting a delay timer. BS 100 waits as indicated in step 706 for the random delay timer to time out as indicated in step 711. If the selected channel (CHselect) is in use, BS 100 terminates execution of step 709 and jumps to step 704 to select a new frequency for switching. Steps 706, 707 and 708 are repeated for the new frequency.

In one embodiment of the invention BS 100 senses the selected channel (CHselect) to determine if the selected channel is still available. In one embodiment of the invention BS100 carries out a step of communicating on operating channel Cop at the same time BS 100 is performing the sensing step. In an alternative embodiment of the invention BS 100 senses the selected channel (CHselect) at a time before the random wait timer times out. If the selected channel (CHselect) is in use, BS 100 jumps to step 704 to select a new frequency for switching. Steps 706, 708 and 707 are repeated for the newly selected frequency.

If the selected channel (CHselect) is sensed at step 707 and determined to be unoccupied, BS 100 switches to the selected channel when the random wait timer times out and the process ends at 713. Because each WRAN in a system of the invention generates a random number to provide a switching delay, the likelihood of two BS switching to the same channel at the same time is negligible. Therefore the BS with the longer random delay time is likely to detect the presence of the BS with the shorter random delay time during sensing step 707.

In one embodiment of the invention BS 100 senses the selected channel (CHselect) at a time after the random wait timer times out. In an alternative embodiment, BS 100 advertises the selection of CHselect on the operating channel Cop.

Embodiments of the invention described above may be implemented as a combination of hardware and software elements. Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention. Having thus described the invention, what is desired to be protected by Letters Patent is presented in the subsequently appended claims.

The invention claimed is:

1. A random delay circuit (RDC) used to delay the switching of a transceiver from a first channel to a second channel in a node of a wireless communication network comprising a medium access controller (MAC), the random delay circuit comprising:
a random number generator to provide a random number; and
a wait timer provided with a random delay time ($t_{rwait}$) based on the random number;
wherein the random delay time ($t_{rwait}$) is used to provide a delay switching time for the transceiver to switch from the first channel to the second channel.

2. The random delay circuit of claim 1 wherein said transceiver is part of a base station (BS) of a wireless regional area network (WRAN), wherein the base station uses a cognitive radio (CR) to sense occupancy of said first channel, wherein said transceiver is switched in response to sensed occupancy of said first channel at a time delayed by said random delay time ($t_{rwait}$).

3. A medium access controller for switching a base station (BS) of a wireless regional area network (WRAN) from a first channel to a second channel, said controller including a random delay circuit for delaying said switching by a random delay time.

4. The medium access controller of claim 3 wherein said base station includes a channel occupancy sensor coupled to said medium access controller to provide an indication of occupancy of said first channel, said medium access controller coupled to said random delay circuit.

5. The random delay circuit of claim 3, wherein including at least one the random delay time ($t_{rwait}$) is based on the random number to fall within a maximum wait time ($t_{max}$) and a minimum wait time.

6. The random delay circuit of claim 2, wherein said base station selects a second channel from a candidate channel list.

* * * * *